United States Patent [19]
Hochreuter

[11] 3,855,818
[45] Dec. 24, 1974

[54] SHEAR PIN SAFETY COUPLING

[76] Inventor: Johann Hochreuter, Brauhausstrasse 6, D-88 Ansbach, Mittelfranken, Germany

[22] Filed: Aug. 25, 1972

[21] Appl. No.: 283,809

[52] U.S. Cl. .................................... 64/28 R, 64/29
[51] Int. Cl. .............................................. F16d 3/56
[58] Field of Search .......... 64/28 R, 28 M, 29, 30 C

[56] References Cited
UNITED STATES PATENTS

| | | | |
|---|---|---|---|
| 292,095 | 1/1884 | Carlson | 64/28 |
| 1,740,617 | 12/1929 | Morgan | 64/28 |
| 1,978,209 | 10/1934 | Kuhns | 64/28 R |
| 2,307,556 | 1/1943 | Wileman | 64/28 |
| 2,680,357 | 6/1954 | Bowers | 64/28 |
| 2,969,661 | 1/1961 | Swanson | 64/28 |
| 3,623,202 | 11/1971 | Kendall | 64/28 R X |

*Primary Examiner*—Samuel Scott
*Assistant Examiner*—Randall Heald

[57] ABSTRACT

This invention relates to a shearing-pin safety coupling for connecting two shafts, with two coupling halves held together axially by means of the shearing pins and an angular contact bearing holding together the two halves of the coupling on destruction of the shearing pins, said bearing including an annular projection fixed to one half of the coupling fast against rotation relative thereto and overlapping the other half of the coupling, a pair of cooperating bearing surfaces being formed between the cylindrical internal surface of the projection and the cylindrical external surface of the overlapped coupling half portion.

10 Claims, 2 Drawing Figures

SHEAR PIN SAFETY COUPLING

BACKGROUND OF THE INVENTION

Shearing pin safety couplings of the type referred to have already been proposed in the form of toothed coupling with crowned teeth, wherein the annular projection is made in the shape of a bell which wholly embraces the other half of the coupling, a radial lid or inner flange being screwed to the end surface of the bell for sealing this other half of the coupling. The bell consequently consists of two cylindrical projections of different diameters, which are joined together by a rabbet and in addition, the end surface of the projection with the lesser diameter carries the screwed-on inner flange.

If the pins are sheared off in such a coupling after the permissible torque has been exceeded, the bell prevents the halves of the coupling, which may be rotating at high speed, from being flung apart radially or axially. Instead the two halves of the coupling are held in a coaxial alignment which in practice is sufficiently precise, and at a fixed axial distance from one another.

However, because of the relatively complicated design of the bell embracing the one half of the coupling, the known coupling is however expensive to make and, moreover, an increase in the radial dimensions is necessary for the overlapped half of the coupling. Also, the lubrication facilities for the bearing surfaces of the bell are not good, since the escape of grease cannot be prevented.

SUMMARY OF THE INVENTION

The object of the invention is to provide a shearing pin safety coupling which is an improvement over that previously proposed and makes possible, by virtue of a simplified design, a compact and easily lubricated construction of the angular contact bearing. This object is achieved in that the bearing surfaces are formed as ball bearing races of V or semi-circular cross-section and which contain a set of bearing balls.

This construction of a coupling in accordance with the invention makes superfluous the complicated bell hitherto proposed, this being replaced by a hollow cylindrical projection of relatively small axial length which overlaps the other coupling half merely over a small part of the axial length thereof. The ball bearing races are provided only in the region of this half-coupling portion having the small axial length. Consequently the diameter of at least the greater part of the overlapped coupling half is not increased, due to the hollow cylindrical projection, to a greater extent than that needed for the coupling under normal operating conditions when the shearing pins are intact. The ball bearing races can readily be sealed relative to the other parts of the coupling and from the exterior and hence lubricated.

The inventive concept is above all applicable to gear couplings with crowned teeth for the driving of shafts whose alignment can deviate from coaxial alignment by a relatively small range of angles during operation but there are also possible applications to other types of shearing pin safety couplings, for instance, claw couplings.

An embodiment of the invention will now be described, by way of example, with reference to the accompanying drawings.

DESCRIPTION OF THE PREFERRED EMBODIMENT

Figure 1:
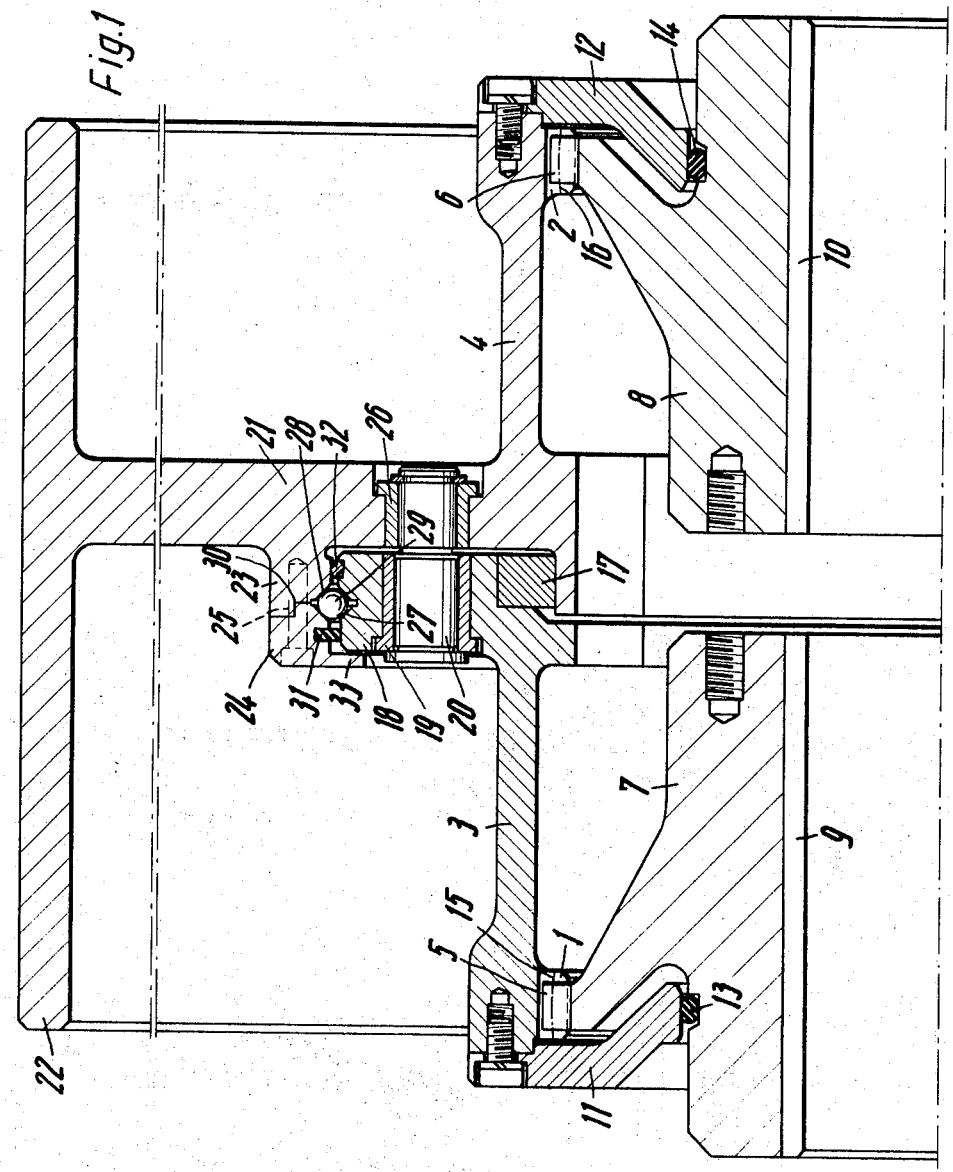
FIG. 1 is an axial half-section of an embodiment of a shearing pin dog coupling in accordance with the invention, with teeth.

The coupling in accordance with FIG. 1 comprises two halves 3 and 4 of a coupling housing, provided at their outermost ends with internal toothing 1 and 2, and which, for simplicity, will hereinafter be called "coupling halves." Each coupling half 3, 4 includes a shaft hub 7, 8 provided with crowned outer teeth 5, 6 and each hub has a groove 9, 10 for the reception of a plate spring (not shown) to insure positive connection with a drive shaft or driven shaft. The entire coupling, i.e. the space surrounded by the coupling halves 3, 4, is filled with oil. In order to provide a seal against leakage of this oil, a lid or internal flange 11, 12 is screwed in oil-tight manner to an end surface of the coupling half 3, 4 adjacent the inner teeth 1, 2 concerned; the lid or internal flange 11, 12 bringing about through an associated O'ring 13, 14 sealing relative to the hubs 7, 8 without imparting their ability to swing, which is indicated by curved portions 15, 16 shown in chain-dotted lines. A seal between the mutually facing end surfaces of the coupling halves 3, 4 is provided by a sealing ring 17 of rectangular cross-section.

The coupling half 3 has a section 18 formed as an external flange, with bushes 19 distributed around its periphery to hold shearing pins 20. The coupling half 4 is provided with an external flange 21 with a brake drum 22 integrally formed. This brake drum 22 forms no part of the invention, and is merely intended to show that there are no difficulties in providing a brake drum, such as is also present in part in known couplings, in a coupling constructed in accordance with the invention The flange 21 has a fixed annular projection member 23 overlapping the coupling half portion 18 and formed integrally with said flange 21, with a facing ring 24 attached to said member 23 by means of screws 25 distributed round its periphery and only indicated in dotted lines. The flange 21 includes bushes 26 similar to the bushes 19 and axially aligned therewith, through which extend the shearing pins 20.

On the cylindrical inner face of the projection formed by the fixed projection member 23 and the facing ring 24, and on the cylindrical external peripheral surface of the coupling half portion 18, there are provided bearing surfaces in the form of ball bearing races 27, 28 of V-shaped cross-section, which in known manner hold a set of ball bearings 29 without a cage for spacing the balls. A cage for reducing friction between the balls 29 is not necessary in the present case, since the coupling halves 3, 4 are normally fixed fast against rotation relative to each other by the shearing pins 20, and need to rotate relative to each other only for relatively short periods of operation after the pins 20 have been sheared.

In order to prevent premature wear of the ball bearing formed by the races 27, 28 and the balls 29, if the pins 20 shear frequently during opertion, the bearing is provided with a grease or oil filling which necessitates an appropriate sealing. For this purpose, the mutually facing end surfaces of the fixed projection member 23 and of the facing ring 24 are axially stepped with formation of an endless rabbet 30. A sealing ring 31 in the form of a lip is provided between the inner surface of the facing ring 24 and the outer surface of the coupling half portion 18; an O-ring 32 made of plastics material is provided between the fixed projection member 23 and the coupling half portion 18. The ball bearing is filled with oil through a radial bore (not shown) which passes through the fixed projection member 23 or the facing ring 24.

In the embodiment of coupling in accordance with FIG. 1, in assembly, the balls 29 may advantageously be inserted in the ball bearing race 27, before the facing ring 24 is screwed on, or in the mutually-adjacent surfaces of ball bearing race 27 and of the surface of race 28 containing the fixed projection member 23, whereafter the facing ring 24 is screwed on. However, the facing ring 24 is not absolutely necessary in installing the balls 29; when the fixed projection member 23 is made integrally with the facing ring 24, the balls 29 can also be inserted through a radial opening which starts in the ball bearing race 28 and passes through the projection comprised by members 23, 24 and after filling, can be closed by an oil-tight plug.

In order to protect the lip sealing ring 31 against penetration by dust and/or dirt, the facing ring 24 has its end remote from the fixed projection member 23 provided with an inner flange 33 overlapping the coupling half portion 18.

When the shearing pins 20 shear during operation due to the permissible torque being exceeded, the ball bearing comprising the races 27, 28 and the balls 29 effectively prevents axial separation of the two coupling halves 3, 4; in addition, insofar as the balls 29 lie without play against the two pairs of inclined surfaces in the ball races 27, 28, any radial movement between the coupling halves 3, 4 is also precluded. At high rotary speeds, such movements could also result in correspondingly high eccentricities and centrifugal forces.

Figure 2:
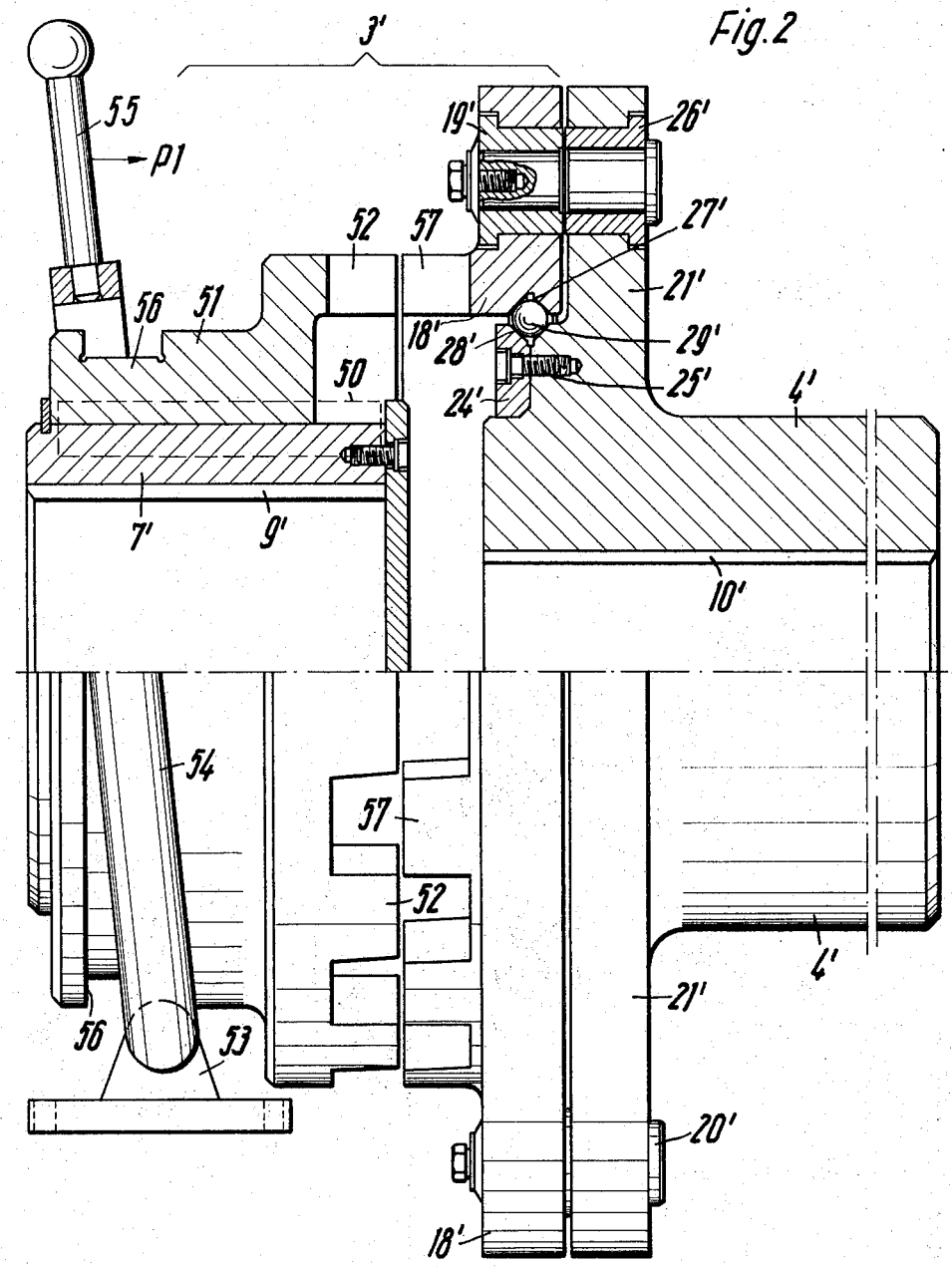
FIG. 2 is partly an axial half-section, partly a side elevation of an embodiment of a shearing pin safety coupling in accordance with the invention, formed as a claw coupling.

In the claw coupling of FIG. 2, functionally analogous components are provided with the same reference numbers as in FIG. 1, together with an additional index stroke. Where further description of operation is unnecessary in view of the explanations relating to FIG. 1, no reference is made below to the corresponding components.

The coupling as in FIG. 2 includes two coupling halves 3', 4' held together by shearing pins 20' distributed round their periphery. The coupling half 4' is intended to receive directly a shaft end, and for this reason is formed as a hub. The coupling half 3 includes a hub 7' adapted to receive the end of a further shaft, and a control sleeve 51 with axial claws 52 is mounted on said hub 7' by means of a disc spring 50 (shown in dotted lines) so that it can move axially. A shift fork 54 with shift lever 55, pivotally mounted by a bearing 53, is engaged by means of projections (not shown) with a peripheral groove 56 in the control sleeve 51.

A coupling half portion 18' of the coupling half 3' has axial claws 57 which, when the shift fork 54 is swung in the direction of the arrow P1, with a corresponding axial displacement of the control sleeve 51, can enter into engagement with the claws 52 of control sleeve 51, so producing a positive drive entrainment between the hub 7' and the coupling half 4' formed as a hub. The form of the components 50–57 does not constitute any part of the present invention, the intention merely being to show that the concept of the invention can also be applied to controllable shearing pin safety couplings.

It will be understood that the projection consisting of the parts 23, 24 in the coupling shown in FIG. 1 can be integrally formed, the coupling half portion 18 being instead divided in a plane perpendicular to its axis into a projection section rotatable with the coupling half 3 and a coupling half facing ring adapted to be screwed on. The same also applies to the coupling half portion 18' included in the coupling shown in FIG. 2.

I claim:

1. A shearing pin safety coupling for connecting two shafts, with two halves of the coupling normally held together axially and rotatably by the pins and an angular contact bearing for axially holding together the two halves of the coupling when the pins are destroyed, said bearing including an annular projection adapted to rotate with one half of the coupling and to overlap the other half of the coupling, with a pair of opposed cooperating bearing surfaces formed between the cylindrical internal surface of the projection and the cylindrical external surface of the overlapped portion of the coupling, the bearing surfaces being formed as captivating endless ball bearing races of V or semicircular cross-section, which retain a set of bearing balls therebetween to permit relative rotation of said coupling halves while resisting relative axial movement.

2. A coupling as claimed in claim 1, in which the projection is divided in a plane intersecting its bearing surface and extending perpendicular to its axis, into a projection member fast with the one coupling half and a front check ring which can be screwed on.

3. A shearing pin safety coupling for connecting two shafts, with two halves of the coupling axially held together by the pins and an angular contact bearing for holding together the two halves of the coupling when the pins are destroyed, said bearing including an annular projection adapted to rotate with one half of the coupling and to overlap the other half of the coupling, with a pair of cooperating bearing surfaces formed between the cylindrical internal surface of the projection and the cylindrical external surface of the overlapped portion of the coupling, the bearing surfaces being formed as ball bearing races of V or semi-circular cross-section, which hold a set of bearing balls, said projection being divided in a plane intersecting its bearing surface and extending perpendicular to its axis, into a projection member fast with the one coupling half and a front check ring which can be screwed on, the mutually facing end surfaces of the fixed projection member and of the front check ring being axially stepped with formation of an endless rabbet.

4. A coupling as claimed in claim 3, in which at its end remote from the fixed projection member the front check ring has an inner flange which overlaps the other coupling half.

5. A coupling as claimed in claim 1, in which the coupling half member overlapped by the projection is divided in a plane intersecting its bearing surface and extending perpendicular to its axis into a fixed coupling half portion and a screwable-on coupling half facing ring.

6. A coupling as claimed in claim 1, in which an oil sealing ring is provided axially on each side of the two ball bearing races at a small axial distance therefrom.

7. A shearing pin safety coupling for connecting two shafts, with two halves of the coupling axially held together by the pins and an angular contact bearing for holding together the two halves of the coupling when the pins are destroyed, said bearing including an annular projection adapted to rotate with one half of the coupling and to overlap the other half of the coupling, with a pair of cooperating bearing surfaces formed between the cylindrical internal surface of the projection and the cylindrical external surface of the overlapped portion of the coupling, the bearing surfaces being formed as ball bearing races of V or semi-circular cross-section, which hold a set of bearing balls, the coupling half member overlapped by the projection being divided in a plane intersecting its bearing surface and extending perpendicular to its axis into a fixed coupling half portion and a screwable-on coupling half facing ring, the facing end surfaces of the overlapped coupling half portion and of the coupling half facing ring being axially stepped to form a continuous rabbet.

8. A coupling as claimed in claim 7 in which an oil sealing ring is provided axially on each side of the two ball bearing races at a small axial distance therefrom.

9. A coupling as claimed in claim 3 in which an oil sealing ring is provided axially on each side of the two ball bearing races at a small axial distance therefrom.

10. A coupling as claimed in claim 1 wherein said opposed cooperating bearing surfaces are axially stepped with the formation of an endless annular rabbet therebetween.

* * * * *